April 14, 1942.　　B. PEARSON　　2,280,003
ARROW HOLDER
Filed July 23, 1940　　2 Sheets-Sheet 1
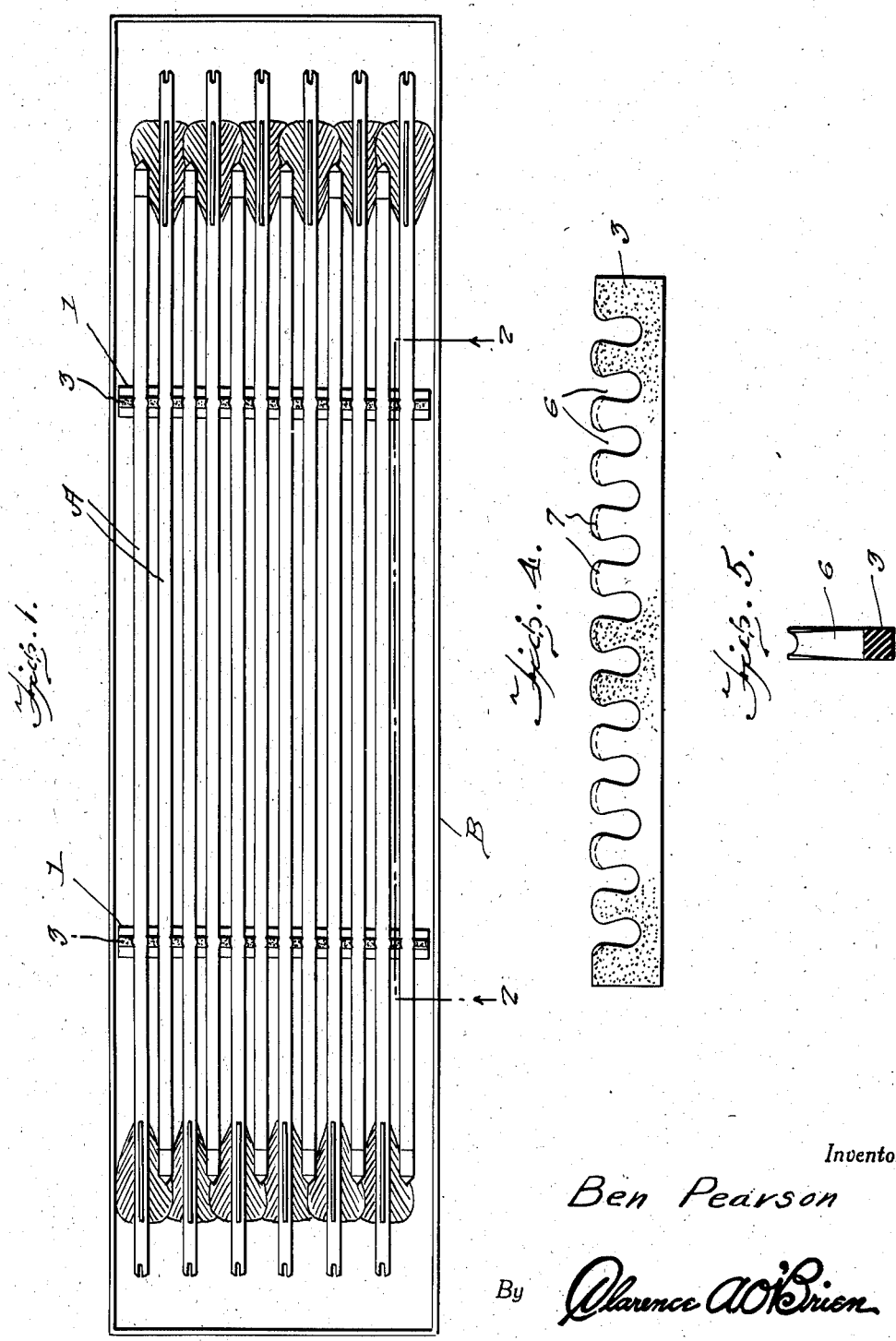
Inventor
Ben Pearson
By Clarence A. O'Brien
Attorney

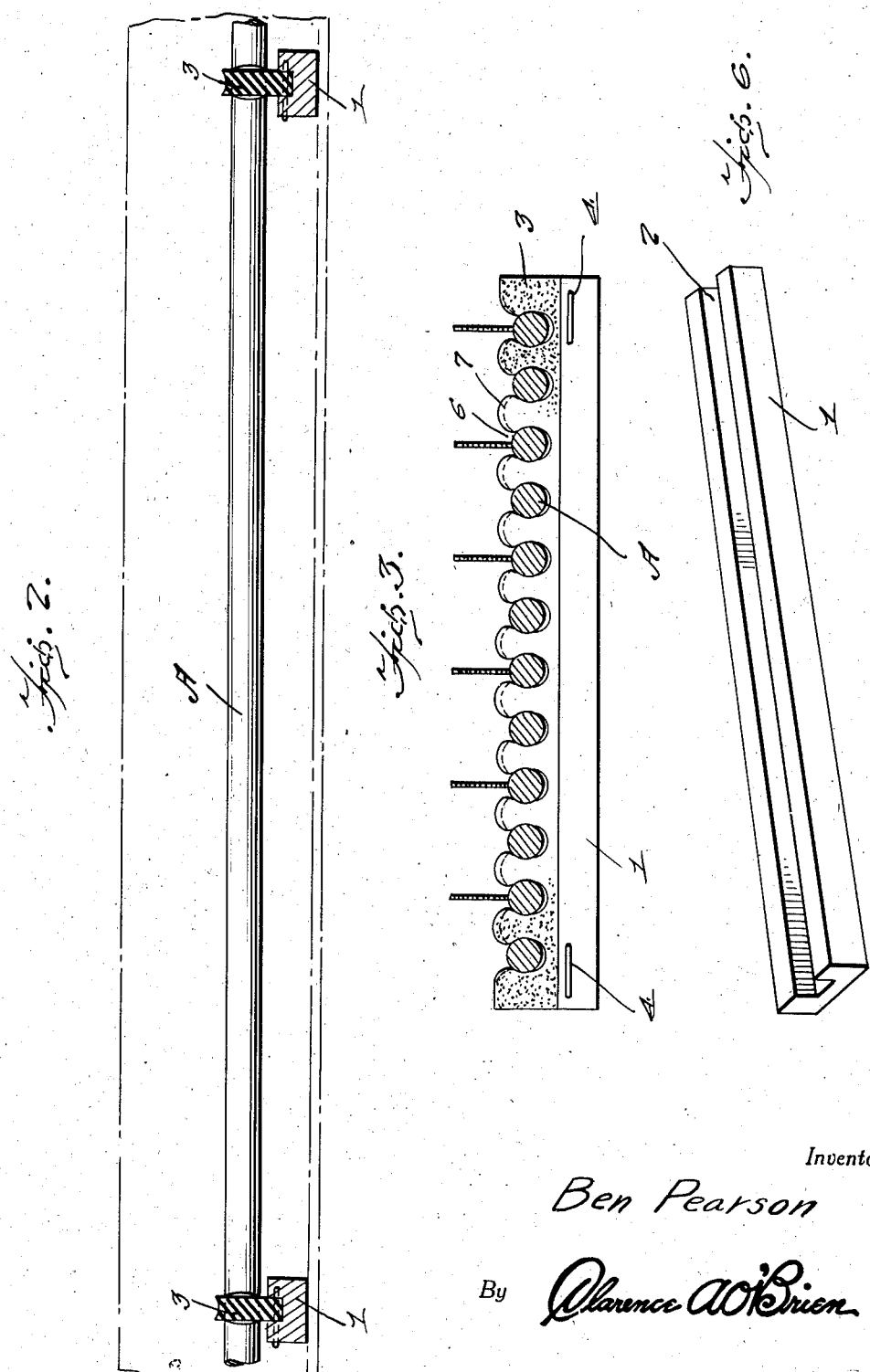

Patented Apr. 14, 1942

2,280,003

UNITED STATES PATENT OFFICE 2,280,003

ARROW HOLDER

Ben Pearson, Pine Bluff, Ark.

Application July 23, 1940, Serial No. 347,035

1 Claim. (Cl. 206—1)

This invention relates to arrow holders, the general object of the invention being to provide strips of rubber having recesses therein with the strips attached to blocks which are adapted to be placed in a box so that arrows can have portions passing through the recesses so that the arrows will be firmly held in the box and against movement.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a top plan view of a box with the cover removed and showing the invention in use for holding arrows in the box.

Figure 2 is a section on the line 2—2 of Figure 1.

Figure 3 is an edge view of a block and a rubber member with the arrows passing through the recesses of the rubber member, said arrows being shown in section.

Figure 4 is an elevation of the rubber member.

Figure 5 is a sectional view through the rubber member, the section being taken through one of the slots.

Figure 6 is a view of one of the grooved blocks for supporting the rubber member.

As shown in these views, I provide a number of blocks or strips 1 each having a longitudinally extending groove therein and a rubber member 3 is supported by each block or strip by having its lower edge fitting in the groove with the rubber member held in the groove by pins or staples 4. This rubber member is formed with a plurality of recesses or slots 6 which have rounded bottoms and form tongues between them with the upper edges of the tongues rounded as shown at 7 and the upper ends of these tongues are enlarged so that they will act to partly close the upper ends of the recesses or slots so as to firmly hold the arrows A in the recesses or slots. As shown in Figure 5 the upper end of each tongue is grooved with the groove extending partly down the side edges of the tongue so that narrow edge portions are left on the upper portions of said tongues which are very flexible and thus parts of the arrows can be readily pushed into the slots or spaces between the tongues and just as readily removed though the enlarged ends of the tongues will prevent accidental displacement of the arrows after they have been put in place.

As shown in Figure 1 a number of these blocks with the rubber members 3 therein are placed in a box B and the arrows are placed in the recesses or slots of the rubber members and thus the arrows are firmly held in the box as shown in Figure 1. The arrows can be readily removed when desired.

While the invention is mainly designed for holding arrows it will, of course, be understood that it can be used for other purposes.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

Holder means of the class described comprising a supporting member, a strip of resilient material having its lower portion supported by the member, said resilient strip having slots extending downwardly from its upper edge with the slots spaced apart to receive objects, the slots forming tongues between them and the tongues having enlarged ends and each tongue having grooves in the side edges of said enlarged ends for making the side edge portions of said side edges of each tongue very flexible.

BEN PEARSON.